INVENTORS
WILBUR H. BUSKER
DONALD W. PARKER

Cushman, Darby & Cushman
ATTORNEYS

April 2, 1968
W. H. BUSKER ET AL
3,375,979
CLIP-ON ATTACHMENT FOR THE IMPULSE ARM OF STEP-BY-STEP ROTARY SPRINKLERS
Filed June 27, 1966
2 Sheets-Sheet 2
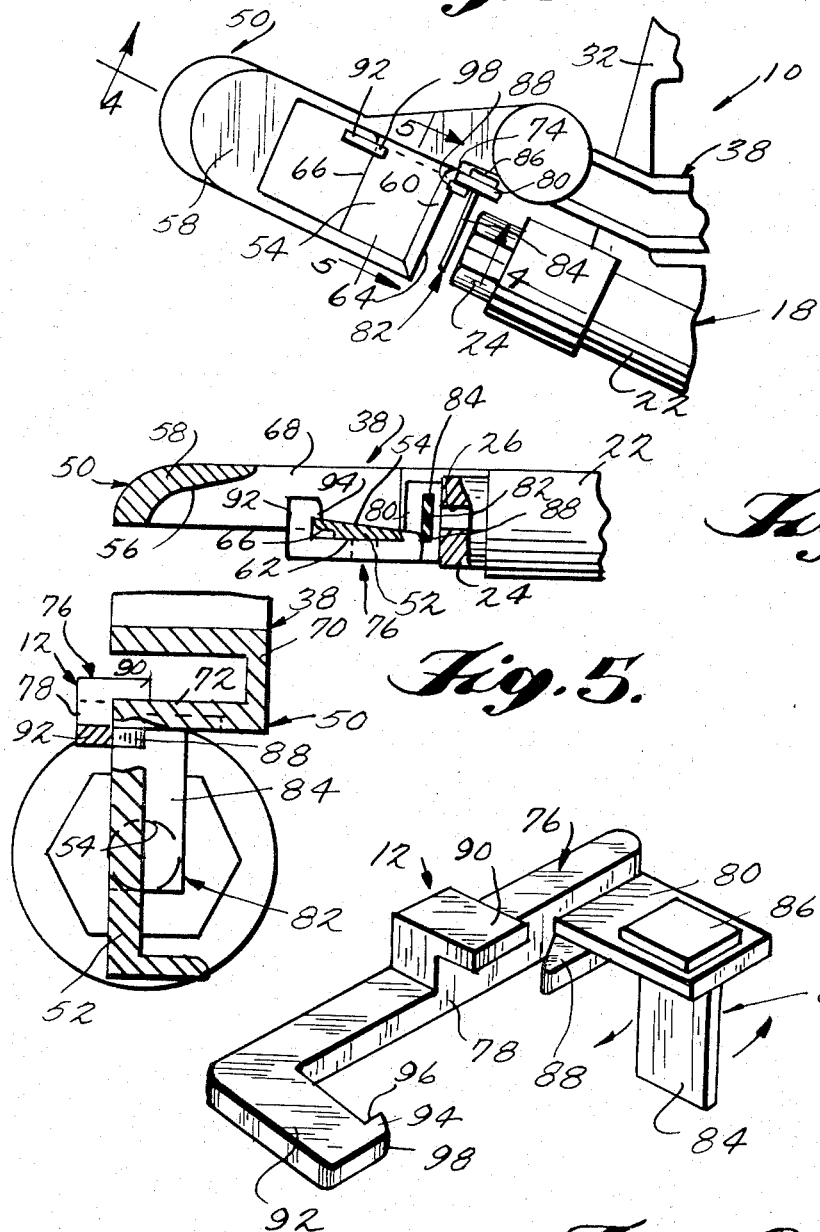
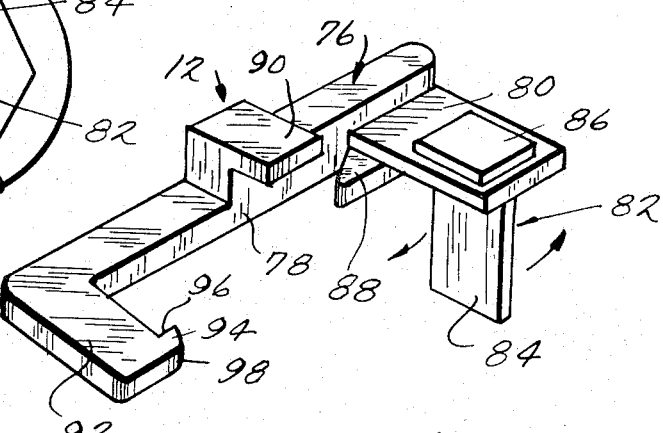
INVENTORS
WILBUR H. BUSKER
DONALD W. PARKER
Cushman, Darby, Cushman
ATTORNEYS

3,375,979
CLIP-ON ATTACHMENT FOR THE IMPULSE ARM OF STEP-BY-STEP ROTARY SPRINKLERS
Wilbur H. Busker, Bartonville, and Donald W. Parker, Peoria, Ill., assignors to L. R. Nelson Mfg. Co., Inc., Peoria, Ill., a corporation of Illinois
Filed June 27, 1966, Ser. No. 560,588
10 Claims. (Cl. 239—230)

This invention relates to sprinklers and more particularly to an attachment for a step-by-step rotary irrigation sprinkler operable to exteriorly close the water discharge outlet of the sprinkler to thereby prevent the entry of insects, such as "mud daubers" or the like, therein.

The extensive use of impulse type step-by-step rotary sprinkler heads in agricultural irrigation, particularly irrigation in citrus tree orchards and the like, has emphasized a problem which has existed all along, namely, that of blockage of the sprinkler head, during inoperative periods, by the nesting of insects within the sprinkler head. Where the sprinkler head remains inactive for a period of time, the exposed outlet opening presents a convenient place for mud daubers and the like to build their nests. In citrus tree orchards where the sprinkler heads are carried by pipe risers at a high elevation, the problem of cleaning a blocked sprinkler head presents some considerable inconvenience.

In recent years there have been various devices proposed for preventing mud daubers from entering through the outlet opening of the sprinkler head. Many of these proposals have proven unsatisfactory due to their complicated nature. A simple closure flap arrangement seems to offer the most acceptable solution. For example, it has been proposed (see Stout Patent No. 3,315,897, dated Apr. 25, 1967), to utilize a flap member which is disposed in closing relation to the outlet opening when the sprinkler head is inactive and which, when the sprinkler head is activated by communication of a source of water under pressure therewith, is moved out of closing relation to the outlet by the stream of water itself permitting normal operation of the sprinkler. Such an arrangement provides the advantage of simplicity in structure. Moreover, by mounting the flap on the impulse arm the arrangement is such that there is a minimum of interference to the water flow pattern. That is, with this arrangement the flap is contacted by the water only when the impulse arm is in its limiting position or closely adjacent thereto, and consequently the stream of water is uneffected by the presence of the flap through a substantial majority of the overall operating time.

The above flap arrangement, as embodied in the sprinkler heads available on the commercial market, consists of an L-shaped piece of rubber or other resilient material, one leg of which is secured to the impulse arm by a pair of bolts engaged within threaded openings formed within the impulse arm and extending through the leg portion. The other leg portion constitutes the flap disposed, when the sprinkler head is inactive, in substantial closing relation to the outlet opening thereof.

This arrangement provides a satisfactory securement of the flap to the impulse arm, however, it requires the boring and tapping of openings in the arm itself to receive the pair of bolts. While such an operation may be readily performed during the initial manufacture of the sprinkler head, it does not provide the operator in the field a simple procedure whereby existing sprinkler heads can be readily modified to prevent nesting of mud daubers therein. Moreover, this manner of securement of the flap to the impulse arm does not provide optimum economy even when performed during the manufacturing of the head itself.

An object of the present invention is the provision of an attachment including a flap structure of the type described, which may be simply mounted on the impulse arm of a sprinkler head with a simple clip-on action, thereby alleviating the problems noted above.

Another object of the present invention is the provision of an anti-mud dauber attachment for a sprinkler head of the type described which may be simply and readily attached to the impulse arm of the sprinkler head by the operator in the field, without the use of any tools or the need to modify the existing sprinkler head structure in any way.

Another object of the present invention is the provision of an attachment of the type described which is simple in construction, economical to manufacture, and effective in operation.

These and other objects of the present invention will become more apparent during the course of the following detailed description and appended claims.

The invention may best be understood with reference to the accompanying drawings wherein an illustrative embodiment is shown.

In the drawings:

FIGURE 3 is a fragmentary rear elevational view of a portion of the structure shown in FIGURE 1 including the attachment of the present invention;

FIGURE 4 is a sectional view taken along the line 4—4 of FIGURE 3;

FIGURE 5 is a sectional view taken along the line 5—5 of FIGURE 3; and

FIGURE 6 is a perspective view of the attachment of the present invention.

Figure 1:
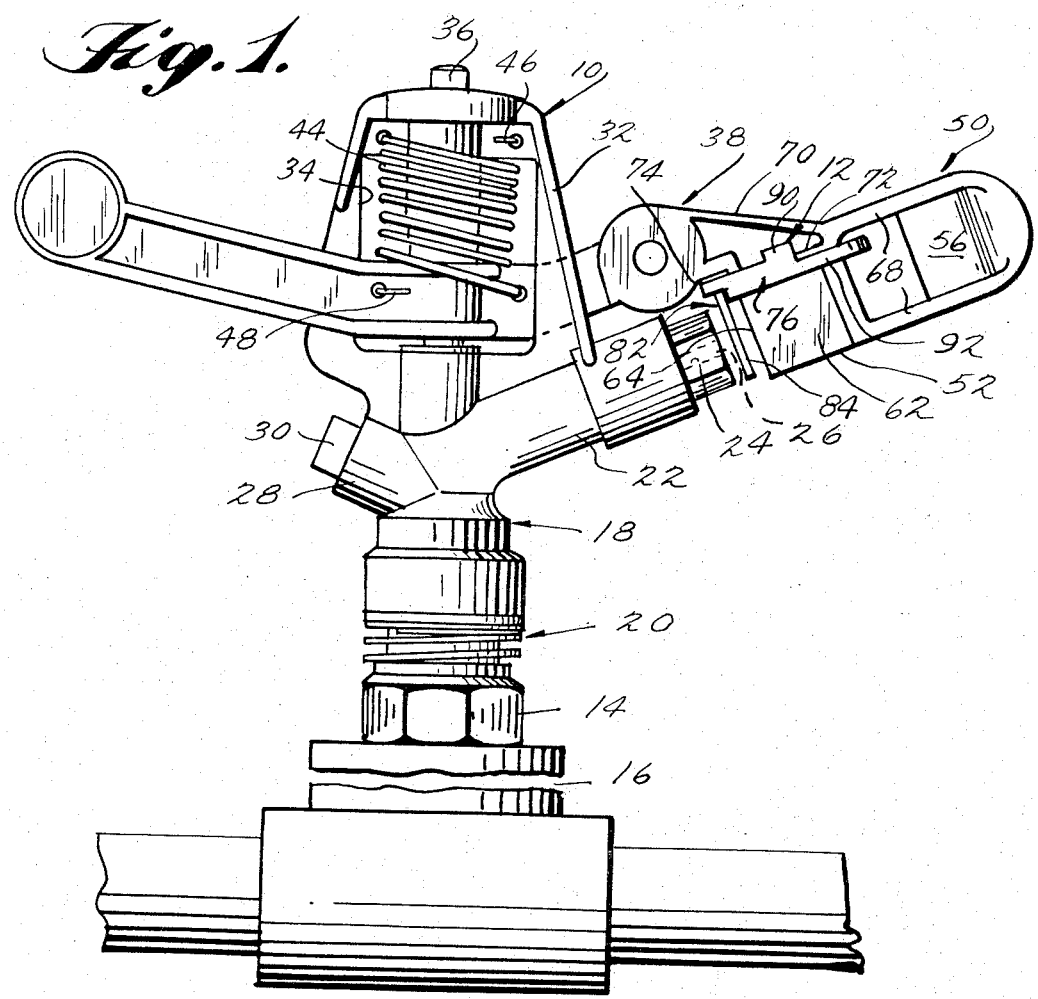
FIGURE 1 is a front elevational view of a sprinkler head with the parts thereof illustrated in inactive position and the attachment of the present invention secured thereto in substantial closing relation with respect to the exterior of the outlet opening of the sprinkler head to thereby prevent ingress of mud daubers and the like through the outlet opening.

Referring now more particularly to the drawings, there is shown in FIGURE 1 a sprinkler head, generally indicated at 10, having an anti-mud dauber attachment, generally indicated at 12, embodying the principles of the present invention affixed thereto.

The sprinkler head 10 may be of any conventional construction, the sprinkler head shown, for example, being a commercially available embodiment made of plastic and merchandised under the trademark "Rain Bird." As shown, the sprinkler head includes a tubular fitting 14 adapted to be fixedly connected with the upper end of a riser pipe 16 of a conventional irrigation pipe system or the like. The fitting 14 rotatably receives the lower end of a springler body, generally indicated at 18, the rotatable connection including the usual spring seal assembly, generally indicated at 20. The sprinkler body includes an upper tubular portion 22 extending upwardly and outwardly with respect to the vertical axis of rotation and having a nozzle member 24 formed in the outer end thereof, the nozzle member including a central outlet opening 26 through which a main stream of water under pressure is discharged in the operation of the sprinkler head. A second tubular portion 28 is provided below the tubular portion 22 in diametrically opposed relation which defines an auxiliary outlet which, in the embodiment shown, is closed as by a plug 30 or the like.

The sprinkler body 18 also includes an upper central portion 32 having an opening 34 extending horizontally therethrough within which is mounted a shaft 36. Journaled on the shaft for oscillating movement or limited pivotal movement with respect to the sprinkler body 18 is an impulse arm, generally indicated at 38.

The impulse arm 38 is provided with a pair of oppositely facing striker surfaces 40 adapted to engage cooperating striker surfaces 42 formed on the upper portion 32 of the sprinkler body 14. A coil spring 44 is mounted in surrounding relation to the shaft 36 and has one end thereof connected with the upper portion 32 of the sprinkler body, as at 46 and its opposite end connected with the adjacent portion of the impulse arm 38 as indicated at 48. The spring 44 serves to resiliently urge the impulse arm 38 into a limiting positition wherein the cooperating striker surfaces 40 and 42 are in engagement with each other.

Figure 2:
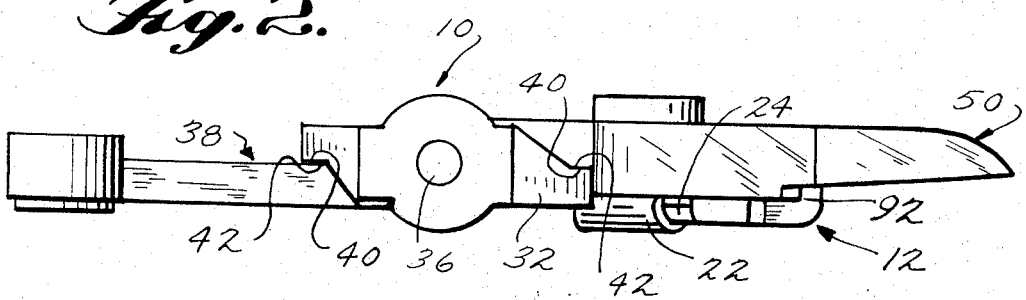
FIGURE 2 is a top plan view of the structure shown in FIGURE 1.

The impulse arm 38 also includes a water reaction section, generally indicated at 50, which is positioned within the path of a stream of water issuing from the outlet opening 26 when the impulse arm is disposed in its limiting position, as shown in FIGURES 1 and 2. The reaction section 50 includes an inner portion 52 defined by an inclined flat surface 54 which extends in a direction outwardly of the axis of the sprinkler body at an angle inclined in a direction such that a stream of water issuing from the outlet opening 26, when the impulse arm is in its limiting position, will impinge upon the surface 54 and produce a reaction force tending to move the impulse arm toward its limiting position. Moreover, the inclination of the surface 54 is such as to direct the stream of water impinging thereon onto a generally arcuate outer reaction surface 56 defining a part of a spaced outer reaction portion 58. The reaction surface 56 extends in a direction such that water impinging thereon produces a reaction force tending to move the impulse arm away from its limiting position.

In accordance with conventional practice, since the lever arm of the reaction force acting on the reaction surface 56 is greater than the lever arm of the reaction force acting on the reaction surface 54, the impulse arm will move in a direction away from its limiting position against the action of spring 44 in response to the impingement of the stream of water issuing from the outlet opening 26 on the reaction section 50. The section 50 thus serves to effect movement of the impulse arm in one direction away from its limiting position and the spring means 44 effects movement of the impulse arm in the opposite direction toward its limiting position. In accordance with conventional practice, when the impulse arm is moved into its limiting position by means of the spring 44, striker surfaces 40 and 42 engage one another effecting a partial rotational movement of the sprinkler body about its axis of rotation.

The above mode of operation of the sprinkler 10 is all in accordance with conventional practice. It will be noted that in the specific embodiment shown, the inner reaction portion 52 is defined by an inner marginal surface 60 which joins at its outer edge with the inner edge of the surface 54 and defines with a flat back surface 62, a sharp inner edge 64. The outer edge of the reaction surface 54 is joined with the outer edge of the back surface 62 by an outer marginal edge surface 66.

The inner and outer reaction portions 52 and 58 are integrally connected by a pair of spaced arm portions 68, the inner reaction portion 52 being integrally united as part of the arm 38 by a hollow, generally triangularly shaped connecting portion 70 defining an upwardly and inwardly facing surface 72 at the upper end of the inner reaction portion 52 and a downwardly and outwardly facing surface 74 spaced inwardly of the surface 72.

Referring now more particularly to FIGURES 3 through 6, the attachment 12 of the present invention comprises a mounting member, generally indicated at 76, which is preferably molded of a suitable moldable material, as, for example, plastic or the like, a preferred material being a linear, high molecular weight, stable, moldable, homoploymeric, oxymethylene, for example, as described in MacDonald Patent No. 2,768,994. Polycarbonates may also be used to good advantage. The preferred materials are available commercially under the trademarks "Delrin" and "Celcon."

The mounting member includes an elongated body portion 78 having a flap receiving portion 80 extending outwardly from one end thereof. The flap receiving portion 80 is provided with a central opening 82 through which a flap member 84 extends. The flap member is made of a resilient material having considerable flexibility, such as rubber, preferably a synthetic rubber, although plastic materials may also be used. As shown, the flap member is of generally T-shaped configuration including a main stem portion 84 and a base portion 86. The flap member is mounted within the flap receiving portion 80 by engaging the stem portion 84 through the opening 82 until the base portion 86 engages the upper surface of the flap receiving portion 80 of the mounting member 76.

Means is provided on the mounting member 76 for securely attaching the same to the inner reaction portion 52 of the impulse arm 38 by a simple clip-on action to retain the flap portion 84 in substantial closing relation to the exterior of the outlet opening 26 when the impulse arm is disposed in its limiting position, as shown in FIGURES 1 and 2. To this end, the mounting member 76 includes an inner hook portion 88 formed integrally with the body portion 78 at a position below and adjacent to the juncture of the flap receiving portion 80 therewith.

At the outer end of the body portion, there is formed a guide and retaining portion 90 which extends outwardly therefrom in the same direction as the flap receiving portion 80, but in vertically spaced relation with respect thereto. Finally, a resilient locking portion 92 of generally L-shaped configuration extends outwardly and then inwardly from the outer end of the main body portion 78. The outer free end of the resilient locking portion 92 is formed with a locking tab 94 having an inner locking surface 96 and an outer cam surface 98.

*Operation*

The attachment 12 of the present invention is secured to the impulse arm 38 of the sprinkler head 10 by moving the mounting member 76 into an initial attaching position with respect to the reaction section 50 of the impulse arm. In this position, the hook portion 88 is engaged over the inner edge 64 of the inner reaction portion 52 and the resilient locking portion 92 is moved toward the outer surface 66 until the guide and retaining portion 90 is disposed in engagement with the surface 72 at the upper end of the inner reaction portion 52. With the mounting member in this initial attaching position, the attachment is then moved into an operatively attached position wherein the locking tab engages over the outer end of the reaction surface 54 and the base portion 86 of the flap member is disposed in engagement or substantial engagement with the surface 74

The movement of the mounting member from the initial attaching position to the operatively attached position is accomplished by simply pushing on the body portion in a direction toward the back surface 62 of the reaction portion 52. During this movement, the outer cam surface 98 of the resilient locking portion 92 will engage the outer surface 62 and be yieldingly moved outwardly in a direction transverse to the direction which the mounting member is pushed. When the mounting member reaches its operatively attached position, the resilient locking portion 92 moves inwardly to its normally biased position to engage the locking surface 96 with the outer end of the reaction surface 54.

In its operatively attached position, the mounting member is firmly fixed to the mounting arm, movement of the mounting member with respect to the arm being prevented in every direction. Thus, the engagement of the hook portion 88 with the edge 64 and marginal surface 60, the engagement of the body portion 78 with the surface 62, and the engagement of the resilient locking portion 92 with the outer marginal surface 66 and outer end portion of the surface 54, all serve to prevent movement in either direction within a plane perpendicular to the edge 64. Movement in either direction along the extent of the edge 64 is prevented by engagement of the guide and retaining portion 90 with the surface 72 and interengagement of the base portion of the flap member with the surface 74.

It can be seen that the attachment 12 of the present invention is thus capable of being fixedly mounted on the impulse arm by a very simple manual manipulation. Once it has been moved into its operatively attached position, however, the mounting member is firmly fixed to the arm in such a way that it will not work loose or lose its firm securement through extended operation during which the arm is subjected to repeated impact forces. Moreover, it will be noted that the mounting member, when disposed in its operatively attached position, does not include any substantial portions which would interfere with the flow of water to the reaction section of the impulse arm.

It will be understood that when the sprinkler head is inactive, the impulse arm will be disposed in the limiting position, as shown in FIGURES 1 and 2, under the influence of spring 44. With the impulse arm 38 in its limiting position and the sprinkler head inactive, the flap member 82 is retained in a position in substantial closing relation to the exterior of the outlet opening 26, as best shown in FIGURES 1, 3 and 5. The flap member thus closes the entrance of the outlet opening to insects, such as mud daubers or the like, thereby preventing the clogging of the sprinkler head by the nesting activities of such insects when the sprinkler head is inactive.

It will be noted, however, that when it is desired to operate the sprinkler head and the outlet opening 26 is communicating with a source of water under pressure, the stream of water issuing therefrom will, through the flexible resilience of the flap member, effect a movement of the flap member out of closing relation permitting the stream of water to impinge upon the reaction section 50 so that normal operation of the sprinkler head takes place. Since the flap is carried by the impulse arm, it will be moved out of contact with the stream of water issuing from the outlet opening 26 at all times except when the impulse arm is disposed in its limiting position or closely adjacent thereto. Consequently, during a substantial majority of the operation of the sprinkler head, the water stream issuing from the outlet opening is uneffected by contact with the flap member so as to insure a maximum desirable flow pattern to the area being irrigated.

These advantageous results are obtained in accordance with the principles of the present invention by an attachment which is made up of only two separate members, both of which are susceptible to high speed economical fabrication (i.e., molding and slicing an extrusion) from relatively low cost masterials. Assembly of the components is quite easy, involving the mere insertion of the flap member within an opening in the mounting member. Of primary significance, however, is that the attachment can be firmly fixed in operatively attached position to the impulse arm of the sprinkler by a simple digital pushing action. Once clipped on, however, securement is quite effective making it possible to provide existing sprinklers in the field with mud dauber preventing capabilities with a maximum of simplicity and ease. No modification of existing sprinkler heads is required, nor are any tools necessary to effect attachment. Not only is in-the-field securement facilitated, but in-factory securement as well.

It thus will be seen that the objects of this invention have been fully and effectively accomplished. It will be realized, however, that the foregoing specific embodiment has been shown and described only for the purpose of illustrating the principles of this invention and is subject to extension change without departure from such principles. Therefore, this invention includes all modifications encompassed within the spirit and scope of the following claims.

It is claimed:

1. In combination, a sprinkler of the type including
a step-by-step rotatable sprinkler body having a water discharge outlet therein,
an impulse arm mounted for oscillating movement with respect to said sprinkler body,
spring means resiliently biasing said arm for movement in one direction into a limiting position with respect to said sprinkler body,
said arm having a section disposed in the path of a stream of water issuing from said sprinkler body outlet when said arm is disposed in said limiting position shaped so that the water impinging thereon will effect a movement of said arm in the opposite direction away from said limiting position,
interengaging means acting between said arm and said sprinkler body operable during repeated oscillating movements of said arm as a result of the operation of said arm section and spring means in response to a continuous stream of water issuing from said outlet to effect repeated step-by-step rotary movements of said sprinkler body, and
an attachment for covering the exterior of said sprinkler body outlet when no stream of water is issuing therefrom to prevent insects and the like from entering said outlet and nesting within said sprinkler body to clog the same, said attachment comprising
a mounting member mounted in operatively attached position on said arm, said mounting member being mounted in said operatively attached position by movement in one direction from an initial attaching position,
said mounting member including a resilient locking portion movable in a direction transverse to said one direction yieldingly out of a normally biased position during the movement of said mounting member in said one direction from said initial attaching position toward said operatively attached position and operable to resiliently move into its normally biased position in response to the movement of said mounting member to said operatively attached position,
said mounting member and said locking portion including abutment surfaces engaging said arm to positively prevent movement of said mounting member with respect to said arm in all directions, and
an outlet covering flap carried by said mounting member in a position to be disposed closely adjacent the exterior of said outlet when said arm is disposed in said limiting position so as to prevent ingress of insects and the like through said outlet when no stream is issuing from said outlet, said flap being movable out of covering relation to said outlet by a stream of water issuing from said outlet so as to permit said stream to impinge upon said arm portion and effect the aforesaid repeated oscillating movements of said arm.

2. The combination as defined in claim 1 wherein said arm section includes an inner reaction portion and a spaced outer reaction portion, said inner reaction portion including a reaction surface facing in a direction to receive a stream of water issuing from said outlet when said arm is disposed in said limiting position such that the reaction force thereon tends to move said arm into said limiting position, said reaction surface terminating at inwardly and upwardly extending inner and outer edges, said mounting member including a hook portion spaced from said locking portion, said hook portion defining one of said abutment surfaces engaging said inner edge, said locking portion defining one of said abutment surfaces engaging said outer edge.

3. The combination as defined in claim 2 wherein said arm includes an inwardly and upwardly facing surface adjacent the upper end of said inner reaction portion, said mounting member including a laterally extending guide and retaining portion, said abutment surfaces including an outwardly and downwardly facing surface on said guide and retaining portion engaging said inwardly and upwardly facing arm surface.

4. The combination as defined in claim 3 wherein said mounting member includes a laterally extending flap receiving portion, said flap receiving portion having a center opening therethrough, said flap member being of generally T-shaped configuration and being mounted on said flap receiving portion with the stem portion thereof extending through said opening and the base portion thereof engaging the adjacent area of said flap receiving portion.

5. The combination as defined in claim 4 wherein said arm includes an outwardly and downwardly facing surface spaced inwardly from said inwardly and upwardly facing surface, the base portion of said flap member being disposed in substantial engagement with said outwardly and downwardly facing surface.

6. An attachment for a sprinkler of the type including a step-by-step rotatable sprinkler body having a water discharge outlet therein, an impulse arm mounted for oscillating movements with respect to said sprinkler body, spring means resiliently biasing said arm for movement in one direction into a limiting position with respect to said sprinkler body, said arm having a portion disposed in the path of a stream of water issuing from said sprinkler body outlet when said arm is disposed in said limiting position shaped so that the water stream impinging thereon will effect a movement of said arm in the opposite direction away from said limiting position, and interengaging means between said arm and said sprinkler body operable during repeated oscillating movements of said arm with respect to said sprinkler body as a result of the operation of said arm portion and spring means in response to a continuous stream of water issuing from said outlet to effect repeated step-by-step rotary movements of said sprinkler body, said attachment comprising a mounting member engageable with said arm in an initial attaching position and movable from said initial position in one direction into an operatively attached position, said mounting member including a resilient locking portion movable in a direction transverse to said one direction yieldingly out of a normally biased position in response to the movement of said mounting member in said one direction from said initial attaching position toward said operatively attached position and operable to resiliently move into its normally biased position in response to the movement of said mounting member into said operatively attached position, said mounting member and said locking portion including abutment surfaces engageable with said arm to positively prevent movement of said mounting member with respect to said arm in all directions when said mounting member is disposed in said operatively attached position, and an outlet covering flap carried by said mounting member in a position to be disposed closely adjacent the exterior of said outlet when said mounting member is disposed in said operatively attached position and said arm is disposed in said limiting position so as to prevent ingress of insects and the like through said outlet when no stream is issuing from said outlet, said flap being movable out of covering relation to said outlet by a stream of water issuing from said outlet so as to permit said stream to impinge upon said arm portion and effect the aforesaid repeated oscillating movements of said arm.

7. An attachment as defined in claim 6 wherein said mounting member is molded of plastic material and includes an elongated body portion, said locking portion being of generally L-shaped configuration and extending from one end of said body portion.

8. An attachment as defined in claim 7 wherein said mounting member includes a hook portion adjacent the opposite end thereof disposed in opposed relation to said locking portion.

9. An attachment wherein said mounting member includes a laterally extending flap receiving portion disposed adjacent said hook portion and having a central opening therethrough, said flap member being made of a flexible resilient material and being of generally T-shaped configuration mounted on said flap receiving portion with the stem portion thereof extending through said opening and the base portion thereof in engagement with the adjacent area of said flap receiving portion.

10. An attachment as defined in claim 9 wherein said mounting member includes a laterally extending guide and retaining portion spaced between said hook portion and said locking portion.

References Cited

UNITED STATES PATENTS

| 1,781,028 | 11/1930 | Mapes | 239—506 |
| 1,965,912 | 7/1934 | Strawn | 239—506 |
| 2,621,975 | 12/1952 | Coles | 239—506 |
| 2,623,784 | 12/1952 | Christen | 239—117 |
| 3,204,873 | 9/1965 | Senninger | 239—230 |
| 3,204,874 | 9/1965 | Senninger | 239—230 |

EVERETT W. KIRBY, *Primary Examiner.*